United States Patent
Nguyen et al.

(10) Patent No.: US 7,814,077 B2
(45) Date of Patent: Oct. 12, 2010

(54) RESTORING A SOURCE FILE REFERENCED BY MULTIPLE FILE NAMES TO A RESTORE FILE

(75) Inventors: Joanne T. Nguyen, Saratoga, CA (US); James Patrick Smith, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 11/696,090

(22) Filed: Apr. 3, 2007

(65) Prior Publication Data
US 2008/0250072 A1 Oct. 9, 2008

(51) Int. Cl.
G06F 17/30 (2006.01)
(52) U.S. Cl. .................. 707/695; 707/685; 707/678
(58) Field of Classification Search .................. 707/203
See application file for complete search history.

(56) References Cited

U.S. PATENT DOCUMENTS

| | | | | |
|---|---|---|---|---|
| 5,742,818 | A * | 4/1998 | Shoroff et al. .............. | 707/200 |
| 6,195,650 | B1 * | 2/2001 | Gaither et al. .................. | 707/1 |
| 6,377,958 | B1 * | 4/2002 | Orcutt ........................ | 707/200 |
| 6,920,555 | B1 * | 7/2005 | Peters et al. ................ | 713/100 |
| 6,938,039 | B1 * | 8/2005 | Bober et al. .................... | 707/8 |
| 6,948,038 | B2 * | 9/2005 | Berkowitz et al. .......... | 711/162 |
| 7,047,257 | B2 * | 5/2006 | Fletcher et al. ............. | 707/201 |
| 7,080,102 | B2 | 7/2006 | O'Connell et al. | |
| 7,302,452 | B2 * | 11/2007 | Barfield et al. ............. | 707/200 |
| 7,392,263 | B2 * | 6/2008 | Acharya et al. ............. | 707/102 |
| 7,461,098 | B2 * | 12/2008 | Fletcher et al. ............. | 707/201 |
| 7,478,112 | B2 * | 1/2009 | Dulay et al. ....................... | 1/1 |
| 7,478,117 | B1 * | 1/2009 | Lamb et al. .................. | 707/204 |
| 2002/0143795 | A1 * | 10/2002 | Fletcher et al. ............. | 707/200 |
| 2003/0028736 | A1 * | 2/2003 | Berkowitz et al. .......... | 711/162 |
| 2003/0074378 | A1 * | 4/2003 | Midgley et al. ............. | 707/204 |
| 2004/0002942 | A1 | 1/2004 | Pudipeddi et al. | |
| 2004/0083381 | A1 | 4/2004 | Sobel et al. | |

(Continued)

OTHER PUBLICATIONS

Andrew Mackie et al., Nimda Worm Analysis, Sep. 21, 2001, Security Focus, Incident Analysis Report—Version 2, 8-10, 17-20.*

(Continued)

Primary Examiner—Pierre M Vital
Assistant Examiner—Taelor Kim
(74) Attorney, Agent, or Firm—David W. Victor; Konrad Raynes and Victor LLP

(57) ABSTRACT

Provided are a method, system, and program for restoring a source file referenced by multiple file names to a restore file. An operation is processed to restore a source file having a first file name to a restore file, wherein the source file is in a state of being accessed by a process. A determination is made as to whether a second file name references the source file. A first temporary file name and a second temporary file name are created that both reference the restore file in response to determining that the second file name references the source file. The first temporary file name is renamed to the first file name and the second temporary file name is renamed to the second file name. After the renaming of the first and second temporary file names, the first and second file names reference the restore file.

15 Claims, 4 Drawing Sheets

U.S. PATENT DOCUMENTS

| | | | |
|---|---|---|---|
| 2004/0107416 A1* | 6/2004 | Buban et al. | 717/170 |
| 2004/0111441 A1 | 6/2004 | Saito et al. | |
| 2004/0172421 A1 | 9/2004 | Saito et al. | |
| 2004/0186844 A1 | 9/2004 | Muhlestein | |
| 2005/0021497 A1* | 1/2005 | Kohno | 707/1 |
| 2005/0108688 A1* | 5/2005 | Lucovsky et al. | 717/127 |
| 2005/0226597 A1 | 10/2005 | Cobb et al. | |
| 2006/0106818 A1 | 5/2006 | Reed et al. | |
| 2006/0136443 A1* | 6/2006 | Dulay et al. | 707/101 |
| 2006/0179037 A1 | 8/2006 | Turner et al. | |
| 2006/0184587 A1* | 8/2006 | Federwisch et al. | 707/200 |
| 2006/0206450 A1* | 9/2006 | Fletcher et al. | 707/1 |
| 2007/0073792 A1* | 3/2007 | Nichols et al. | 707/204 |
| 2007/0083501 A1* | 4/2007 | Pedersen et al. | 707/4 |
| 2007/0143588 A1* | 6/2007 | Sherwin et al. | 713/2 |
| 2007/0208783 A1* | 9/2007 | Midgley et al. | 707/201 |
| 2008/0177807 A1* | 7/2008 | Dile et al. | 707/204 |
| 2008/0235300 A1* | 9/2008 | Nemoto et al. | 707/204 |
| 2008/0294703 A1* | 11/2008 | Craft et al. | 707/204 |
| 2009/0063586 A1* | 3/2009 | Jung | 707/203 |
| 2009/0319737 A1* | 12/2009 | Mani et al. | 711/162 |

OTHER PUBLICATIONS

Williams Sobel, Method and Apparatus to Rename Open Files, Dec. 28, 2000, WO 00/79384.*

U.S. Patent Application entitled "Backing-Up and Restoring Files Including Files Referenced with Multiple-File Names", U.S. Appl. No. 11/626,271, filed Jan. 23, 2007, IBM, by inventors J.M. Dile, J.T. Nguyen, V.I. Piletski and J.P. Smith.

J. Richter et al., "A File System for the 21st Century: Previewing the Windows NT 5.0 File System", Microsoft, [online][retrieved Mar. 16, 2007] pp. 1-14, http:www.microsoft.com/msj/1198/ntfs/ntfs.aspx.

"Windows File Protection and Windows", Microsoft, [online][retrieved Jan. 6, 2007] pp. 1-6, http:www.microsoft.com/whdc/archive/wfp.mspx?pf=true.

"System File Protection and Windows ME", Microsoft, [online][retrieved Jan. 6, 2007] pp. 1-4, http:www.microsoft.com/whdc/archive/WinME_sfp.mspx?pf=true.

"Windows NT Backup and Hard Links", Microsoft, [online][retrieved Jan. 6, 2007] http:support.microsoft.com/kb/106166.

"FindFirstFlleNameW", Microsoft, [online][retrieved Jan. 6, 2007] http:msdn2.microsoft.com/en-us/library/aa364421 (d=printer).aspx.

"Hard Link", Wikipedia, [online][retrieved Jan. 17, 2007] pp. 1-3, http:en.wikipedia.org/w/index.php?title=Hard_link&printable=yes.

"Symbolic Link", Wikipedia, [online][retrieved Jan. 17, 2007] pp. 1-3, http:en.wikipedia.org/w/index.php?title=Symbolic_link&printable=yes.

"NTFS Hard Links, Directory Junctions, and Windows Shortcuts", FlexHex, [online][retrieved Mar. 16, 2007] pp. 1-5, http: www.flexhex.com/docs/articles/hard-links.phtml.

* cited by examiner

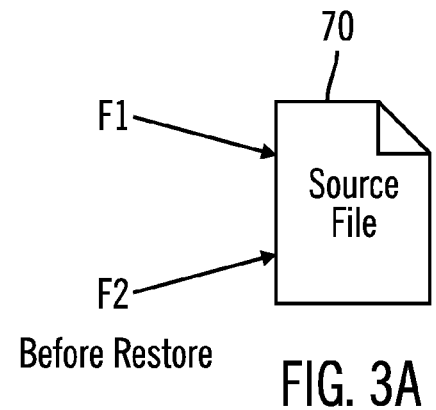
Before Restore    FIG. 3A
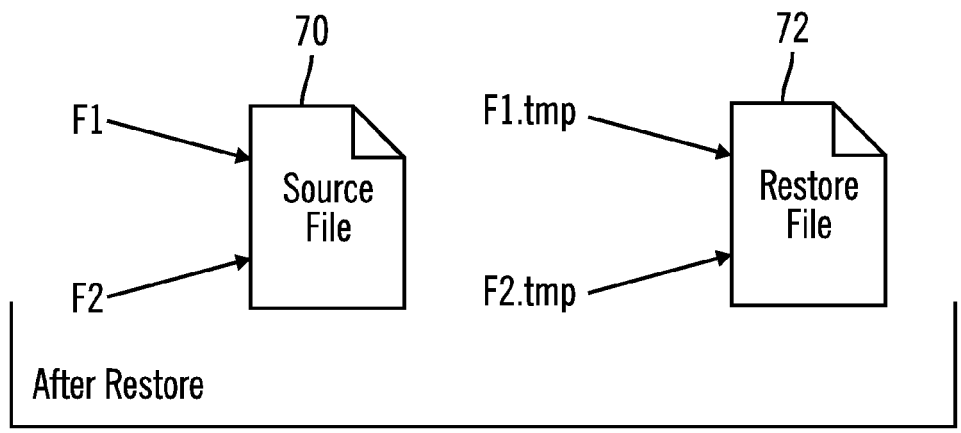
After Restore
FIG. 3B
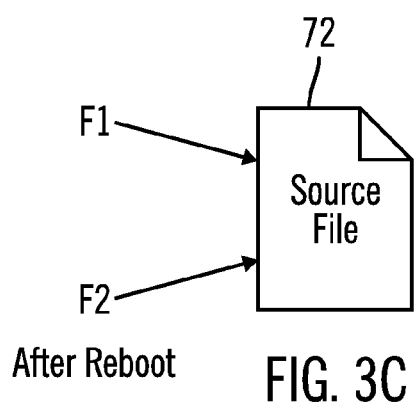
After Reboot    FIG. 3C

RESTORING A SOURCE FILE REFERENCED BY MULTIPLE FILE NAMES TO A RESTORE FILE

BACKGROUND OF THE INVENTION

1. Field of the Invention

The present invention relates to a method, system, and article of manufacture for restoring a source file referenced by multiple file names to a restore file.

2. Description of the Related Art

A file in a file system referenced by a file name may be replaced, restored or updated to a restore file by having the file name of the file reference the restore file. However, if the file is being accessed, then a temporary file name is created pointing to the restore file. During a reboot operation, the file name to replace is deleted and the temporary file name is changed to the original file name to complete the restore operation.

Certain operating systems allow multiple file names to be used to reference a file. For instance, in certain Microsoft® Windows® operating systems, a file may have multiple names that reference the file, referred to as hard links and soft or symbolic links. The master file table of the operating system may include an entry for each file that includes all the names that reference that file. (Microsoft and Windows are registered trademarks of the Microsoft Corporation in the United States and other countries).

There is a need in the art for techniques to restore or replace a file that may be referenced by multiple file names.

SUMMARY

Provided are a method, system, and program for restoring a source file referenced by multiple file names to a restore file. An operation is processed to restore a source file having a first file name to a restore file, wherein the source file is in a state of being accessed by a process. A determination is made as to whether a second file name references the source file. A first temporary file name and a second temporary file name are created that both reference the restore file in response to determining that the second file name references the source file. The first temporary file name is renamed to the first file name and the second temporary file name is renamed to the second file name. After the renaming of the first and second temporary file names, the first and second file names reference the restore file.

BRIEF DESCRIPTION OF THE DRAWINGS

FIGS. 3a, 3b, 3c illustrate a series of operations to restore a source file to a restore file.

DETAILED DESCRIPTION

Figure 1:
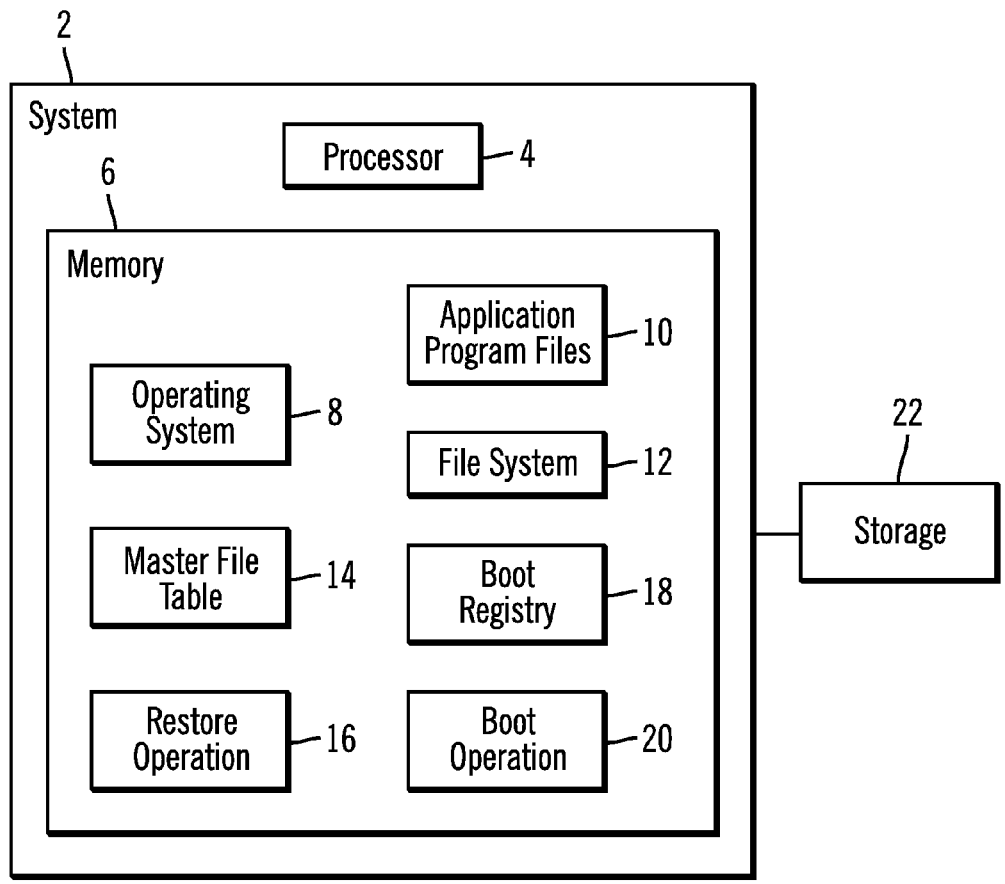
FIG. 1 illustrates an embodiment of a computing environment.

FIG. 1 illustrates an embodiment of a computing environment. A system 2 includes one or more processors 4 and a memory 6 including an operating system 8, application program files 10, and file system 12, such as a hierarchical file system, executed by the processor 4. The operating system 8 maintains a master file table 14 or other similar file directory structure or index that includes an entry for each file created in the file system 12. A restore operation 16 comprises a program to update or replace a current file in the file system 12 with another file. The restore operation 16 may be part of the operating system 8 or other program component. A boot registry 18 includes commands to perform as part of hard or soft reboot operation. The commands in the boot registry 16 may include a command to delete a file and then rename another file to the name of the deleted file. For instance, if the restore operation 16 is invoked to replace (e.g., restore or update the file) a source file currently in use by the application programs 10 or operating system 8, then the restore file, which comprises the file that will replace the source file, is assigned a temporary file name. The restore operation 16 places commands in the boot registry 16 that are performed upon rebooting to delete the file to replace and then rename the temporary file name to the name of the file being replaced to complete the restore or update operation. The system 2 may be coupled to a storage 22 having files that when accessed by the programs 8, 10, and 12 are loaded into the memory 6. A boot operation 20 comprises the process or component that executes booting operations, including commands placed in the boot registry 18.

The system 2 may comprise a suitable computational device known in the art, such as a server, desktop computer, workstation, mainframe, hand held computing device, telephony device, etc. The storage 22 may be implemented in a storage system known in the art, such as a storage system including a plurality of storage devices, e.g., interconnected hard disk drives (a Redundant Array of Independent Disks (RAID), Just a Bunch of Disks (JBOD), Direct Access Storage Device (DASD), disks connected in a loop configuration (serial loop, Fibre Channel Arbitrated Loop), a single storage device, a tape library, an optical library, a network attached storage (NAS), etc.

Figure 2:
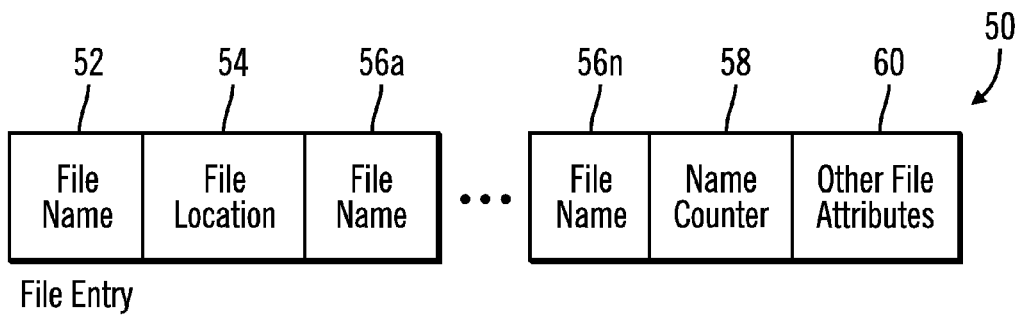
FIG. 2 illustrates information maintained for a file in a master file table of an operating system as known in the prior art.

FIG. 2 illustrates information maintained for a file entry 50 in the master file table 14 in a manner known in the art. The file entry 50 includes a file name 52; a file location 54 comprising the location where the file 52 is located in the storage device 20; optionally one or more additional file names 56a . . . 56n if multiple file names reference the single file, such as the case with hard links; a name counter indicating the number of file names that reference the file identified by the entry 50; and other file attributes 58, such as read-only, hidden, and system flags, creation, accessed, and modified time stamps, etc. In the embodiment of FIG. 2, all the file names are maintained in one file entry 50. In an alternative embodiment, there may be separate file entries 50 for the different file names or hard links referencing a single file.

FIGS. 3a, 3b, and 3c illustrate operations to replace a source file 70 referenced by file names F1 and F2 with a restore file 72 as part of a file update or restore operation. In FIG. 3a, the original source file 70 is referenced by file names F1 and F2, which may comprise hard links. After the restore, if the source file 70 is currently being accessed, e.g., locked, FIG. 3b illustrates that the file names F1 and F2 reference the original source file 70 and temporary file names F1.tmp and F2.tmp both reference the restore file 72. FIG. 3c illustrates that after a reboot or other operation releasing the source file 70, the source file 70 and file names (F1 and F2) are deleted and the temporary file names (F1.tmp and F2.tmp) referencing the restore file 72 are renamed to the original file names F1 and F2. Although FIGS. 3a, 3b, and 3c illustrates operations with respect to two file names that reference the source file 70 and restore file 72, there may be any number of multiple names that reference the original source file 70 and that are updated to reference the restore file 72.

Figure 4:
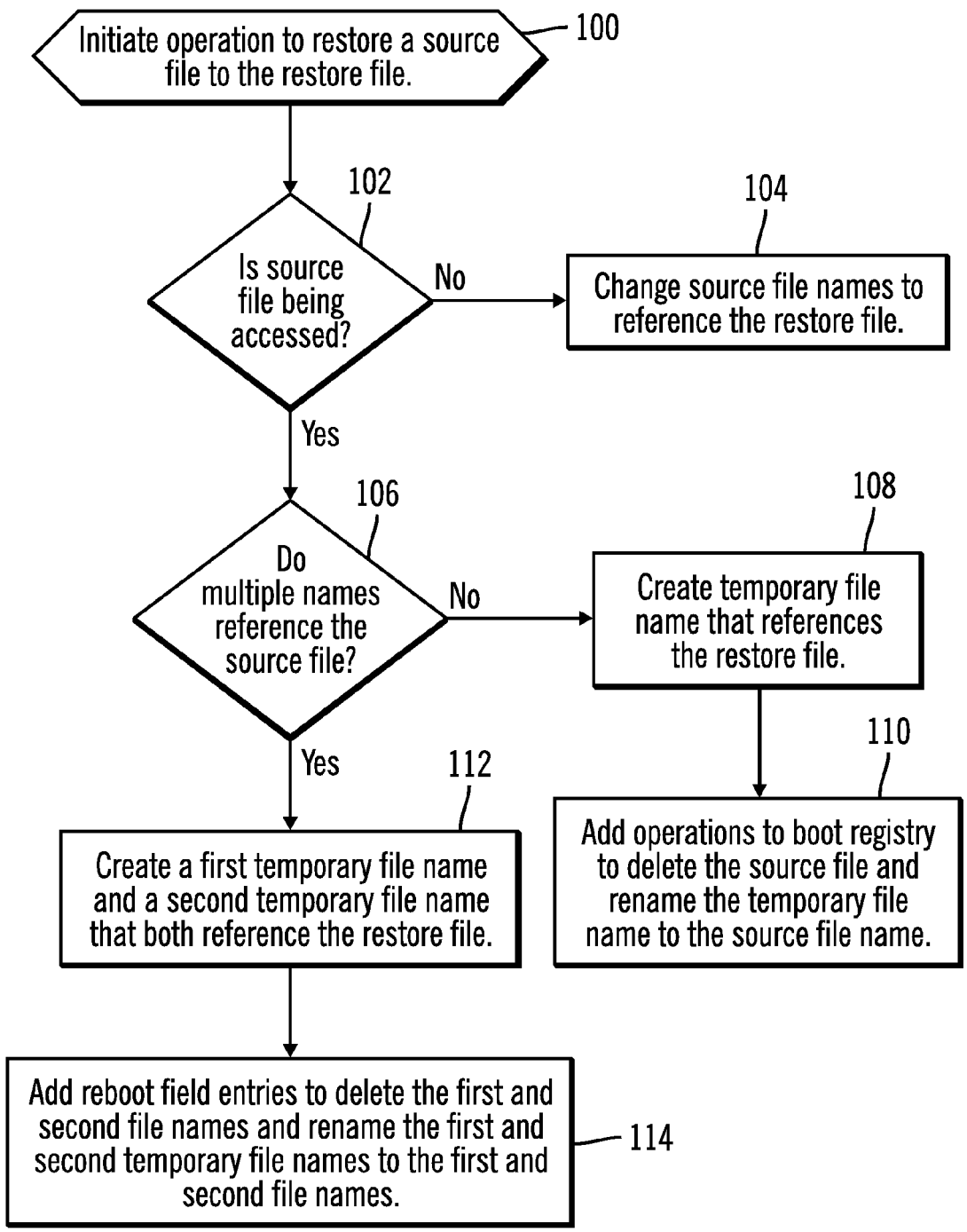
FIGS. 4 and 5 illustrate an embodiment of operations to restore a source file to a restore file.

FIG. 4 illustrates an embodiment of operations performed by the restore operation 16 to replace a source file 70 with a restore file 72, where the restore file 72 may comprise a backup copy being restored, a newer version of the source file 70, etc. The restore operation 16 updates the one or more file names used to access the original source file to reference the restore file 72. Upon initiating (at block 100) the restore operation 16 to restore the source file 70 to a restore file 72, if (at block 102) the source file 70 is not being accessed, then the restore operation 16 may replace (at block 104) the source file 70 with the restore file 72. This may be accomplished by changing the file location 54 in the file entry 50 for the source file 70 to reference the new restore file 72 and then delete the source file 70. If (at block 102) the source file 70 is being accessed and if (at block 106) only one file name 52 references the source file 70, then the restore operation 16 creates (at block 108) a temporary file name (e.g., F1.tmp) that references the restore file 72. The temporary file name may be created by creating a new file entry 50 having the temporary file name 52 whose file location 54 references the restore file 72. One or more entries are added (at block 110) to the boot registry 18 indicating an operation to delete the source file 70 and rename the temporary file name (e.g., F1.tmp) to the source file name (F1) upon the next soft or hard reboot or restart operation. In an alternative embodiment, the commands to delete the source file 70 and rename the temporary file name may be performed when the source file 70 is released and available, without rebooting the system 2.

If (at block 106) multiple file names, e.g., a first and second file names, reference the source file 70 (there are multiple file names 52, 56a . . . 56n in the file entry 52 for the source file 70), then the restore operation 16 creates (at block 112) a first temporary file name (F1.tmp) and a second temporary file name (F2.tmp) that both reference the restore file 72. If there are more than two file names referencing the source file, then the operations described as performed with respect to the first and second temporary file names would also be performed for any additional file names that reference the source file. The restore operation 16 adds (at block 114) one or more entries to the boot registry 18 of commands to delete the file names that reference the source file 70, e.g., the first (F1) and second file names (F2), and rename the temporary file names, e.g., first (F1.tmp) and second (F2.tmp) temporary file names, which reference the restore file 72, to the source file names initially referencing the source file, e.g., first and second file names (F1 and F2). In certain embodiments, the file name delete operation may delete the indicated file names 52, 56a . . . 56n from the file entry 50 for the source file 70. If the file entry 50 referencing the source file 70 does not include any more file names 52, 56a . . . 56n after the delete operation, i.e., the name counter 58 is zero, then the file entry 50 for the source file 70 may be deleted. The restore operation 16 may invoke operating system 8 application program interfaces (APIs) to determine the name references, e.g., hard links, for a file.

Figure 5:
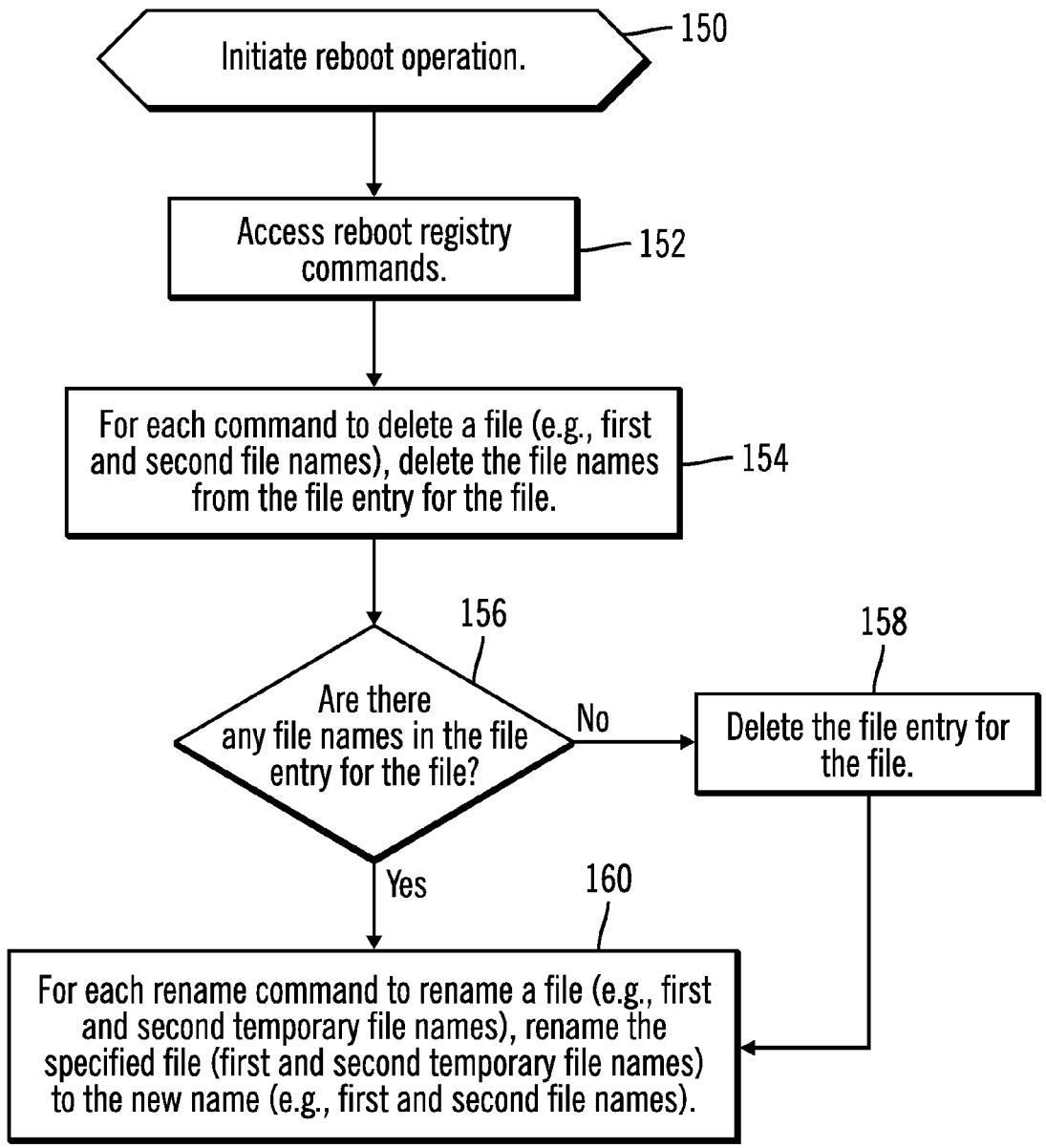

FIG. 5 illustrates an embodiment of operations performed by the boot operation 20, which may be part of the operating system 8 or another component, during a reboot operation to execute the commands in the boot registry 18, i.e., the commands initialized by the restore operation 16. Upon initiating (at block 150) a reboot operation 20, the boot operation 20 accesses (at block 152) the boot registry 18 commands. For each command to delete a file (e.g., first (F1) and second (F2) file names), the reboot operation 20 executes the commands to delete (at block 154) the source files 70 referenced by the deleted file names. A file may be deleted by removing the file names specified in the command from one or more file entries 50 having file name fields 52, 56a . . . 56n matching the file name to delete. If (at block 156) there are no file names 52, 56a . . . 56n remaining in the file entry 50 from which the file names are deleted, then the file entry 50 is removed (at block 158). From block 156 or 158, control proceeds to block 160 to perform (at block 160) the rename operation for each rename command to rename a file (e.g., first (F1.tmp) and second (F2.tmp) temporary file names). The rename operations rename the specified file names (e.g., first (F1.tmp) and second (F1.tmp) temporary file names) to the specified new name (e.g., first (F1) and second (F1) file names). In certain embodiments, a file may be renamed by updating the file name field 52, 56a . . . 56n in the file entry 50 having the file names to the new name.

Described embodiments provide techniques to perform a restore operation to restore a source file referenced with multiple names to a restore file such that the multiple file names referencing the source file are modified to reference the restore file.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variables, e.g., "a", "n", etc., when used to represent a variable number of an element may indicate any number of instances of the element, and may indicate different integer numbers when used with different elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4 and 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method, comprising:
processing an operation in a computer to restore a source file in a computer readable storage medium having a first file name to a restore file in the computer readable storage medium, wherein the source file is in a state of being accessed by a process;
determining whether a second file name references the source file;
creating a first temporary file name and a second temporary file name that both reference the restore file in response to determining that the second file name references the source file;
indicating in a boot registry, which is accessed during a reboot operation, operations to rename the first temporary file name to the first file name and the second temporary file name to the second file name before the reboot operation;
performing a reboot operation of the computer;
accessing the boot registry in response to the reboot operation; and
renaming the first temporary file name to the first file name and renaming the second temporary file name to the second file name in response to performing the operations indicated in the accessed boot registry, wherein after the renaming of the first and the second temporary file names, the first and the second file names reference the restore file in the computer readable storage medium.

2. The method of claim 1, further comprising:
deleting the first file name after creating the first temporary file name, wherein the first temporary file name is renamed to the first file name in response to the deleting of the first file name; and
deleting the second file name after creating the second temporary file name, wherein the second temporary file name is renamed to the second file name in response to the deleting of the second file name.

3. The method of claim 1, further comprising:
creating a first temporary file name that references the restore file in response to determining that no second file name references the source file.

4. The method of claim 1, further comprising:
performing an operation to release the source file from the process accessing the source file to place the source file in a state where no process is accessing the source file after creating the first temporary file name and the second temporary file name, wherein the renaming of the first and the second temporary file names to the first and the second file names, respectively, is performed in response to the file being in the state where no process is accessing the file.

5. The method of claim 1, wherein the determining of whether the second file name references the source file comprises determining whether file attributes of the source file indicate the second file name, wherein the renaming of the first temporary file name and the second temporary file name comprises:
updating the file attributes of the source file to rename the first temporary file name to the first file name and the second temporary file name to the second file name.

6. A system, comprising:
a processor;
a computer readable storage medium including:
a file system having files;
a boot registry;
at least one process accessing files in the file system;

a restore operation executed by the processor to perform operations, the operations comprising:

processing an operation to restore a source file having a first file name to a restore file in the file system, wherein the source file is in a state of being accessed by one of the processes;

determining whether a second file name references the source file;

creating a first temporary file name and a second temporary file name that both reference the restore file in response to determining that the second file name references the source file;

indicating in the boot registry, which is accessed during a reboot operation, operations to rename the first temporary file name to the first file name and the second temporary file name to the second file name before the reboot operation;

performing a reboot operation of the computer;

accessing the boot registry in response to the reboot operation; and renaming the first temporary file name to the first file name and renaming the second temporary file name to the second file name in response to performing the operations indicated in the accessed boot registry, wherein after the renaming of the first and the second temporary file names, the first and the second file names reference the restore file.

7. The system of claim 6, wherein the operations further comprise:

deleting the first file name after creating the first temporary file name, wherein the first temporary file name is renamed to the first file name in response to the deleting of the first file name; and deleting the second file name after creating the second temporary file name, wherein the second temporary file name is renamed to the second file name in response to the deleting of the second file name.

8. The system of claim 6, wherein the operations further comprise:

creating a first temporary file name that references the restore file in response to determining that no second file name references the source file.

9. The system of claim 6, wherein the operations further comprise: performing an operation to release the source file from the process accessing the source file to place the source file in a state where no process is accessing the source file after creating the first temporary file name and the second temporary file name, wherein the renaming of the first and the second temporary file names to the first and the second file names, respectively, is performed in response to the file being in the state where no process is accessing the file.

10. The system of claim 6, wherein the determining of whether the second file name references the source file comprises determining whether file attributes of the source file indicate the second file name, wherein the renaming of the first temporary file name and the second temporary file name comprises:

updating the file attributes of the source file to rename the first temporary file name to the first file name and the second temporary file name to the second file name.

11. An article of manufacture comprising a computer readable storage medium having code executed to cause operations with respect to a file system in a system, wherein processes executing in the system access files in the file system, and wherein the operations comprise:

processing an operation to restore a source file having a first file name to a restore file, wherein the source file is in a state of being accessed by one of the processes executing in the system;

determining whether a second file name references the source file;

creating a first temporary file name and a second temporary file name that both reference the restore file in response to determining that the second file name references the source file;

indicating in a boot registry, which is accessed during a reboot operation, operations to rename the first temporary file name to the first file name and the second temporary file name to the second file name before the reboot operation;

performing a reboot operation of the computer;

accessing the boot registry in response to the reboot operation; and renaming the first temporary file name to the first file name and renaming the second temporary file name to the second file name in response to performing the operations indicated in the accessed boot registry, wherein after the renaming of the first and the second temporary file names, the first and the second file names reference the restore file.

12. The article of manufacture of claim 11, wherein the operations further comprise:

deleting the first file name after creating the first temporary file name, wherein the first temporary file name is renamed to the first file name in response to the deleting of the first file name; and deleting the second file name after creating the second temporary file name, wherein the second temporary file name is renamed to the second file name in response to the deleting of the second file name.

13. The article of manufacture of claim 11, wherein the operations further comprise:

creating a first temporary file name that references the restore file in response to determining that no second file name references the source file.

14. The article of manufacture of claim 11, wherein the operations further comprise:

performing an operation to release the source file from the process accessing the source file to place the source file in a state where no process is accessing the source file after creating the first temporary file name and the second temporary file name, wherein the renaming of the first and the second temporary file names to the first and the second file names, respectively, is performed in response to the file being in the state where no process is accessing the file.

15. The article of manufacture of claim 11, wherein the determining of whether the second file name references the source file comprises determining whether file attributes of the source file indicate the second file name, wherein the renaming of the first temporary file name and the second temporary file name comprises:

updating the file attributes of the source file to rename the first temporary file name to the first file name and the second temporary file name to the second file name.

* * * * *